June 11, 1957  D. Z. ERLE ET AL  2,795,234
COMBINATION MASTER CYLINDER AND POWER VALVE
Filed Aug. 15, 1955  2 Sheets-Sheet 1
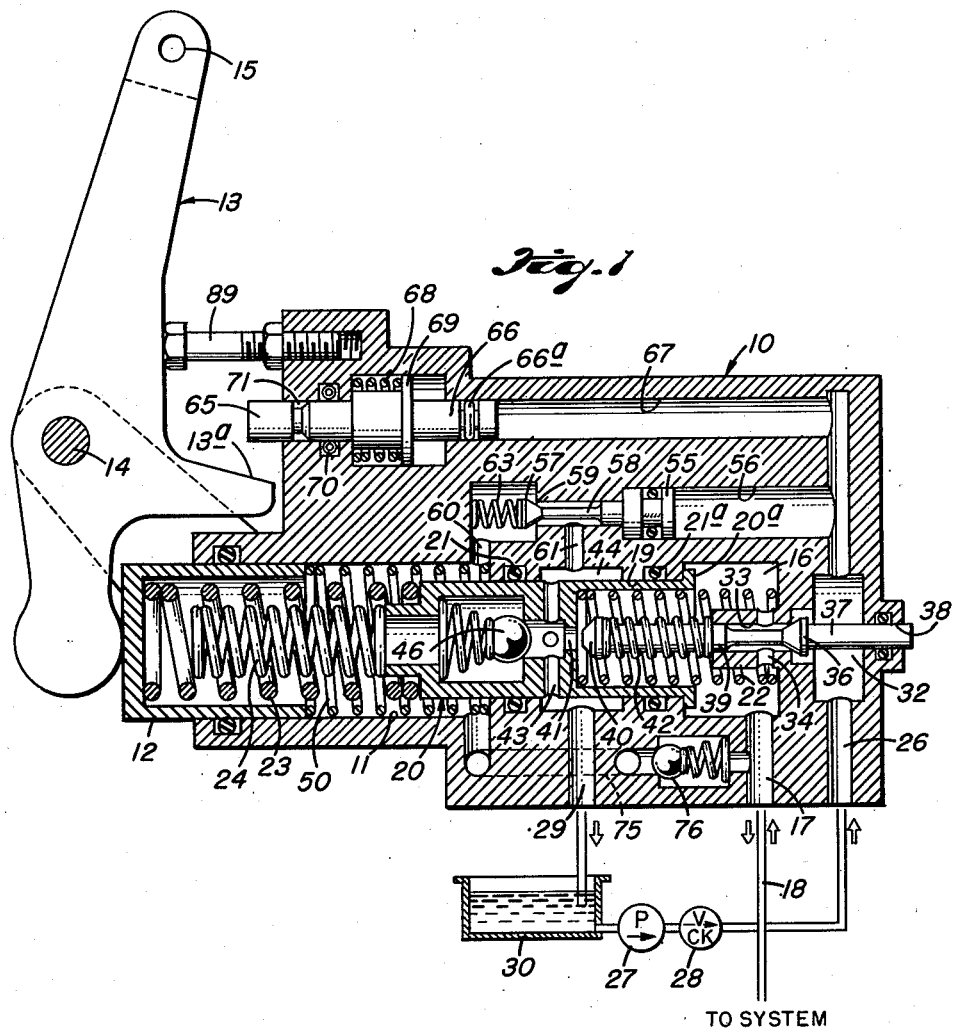
DONALD Z. ERLE
RALPH L. VICK
INVENTORS
BY
ATTORNEY

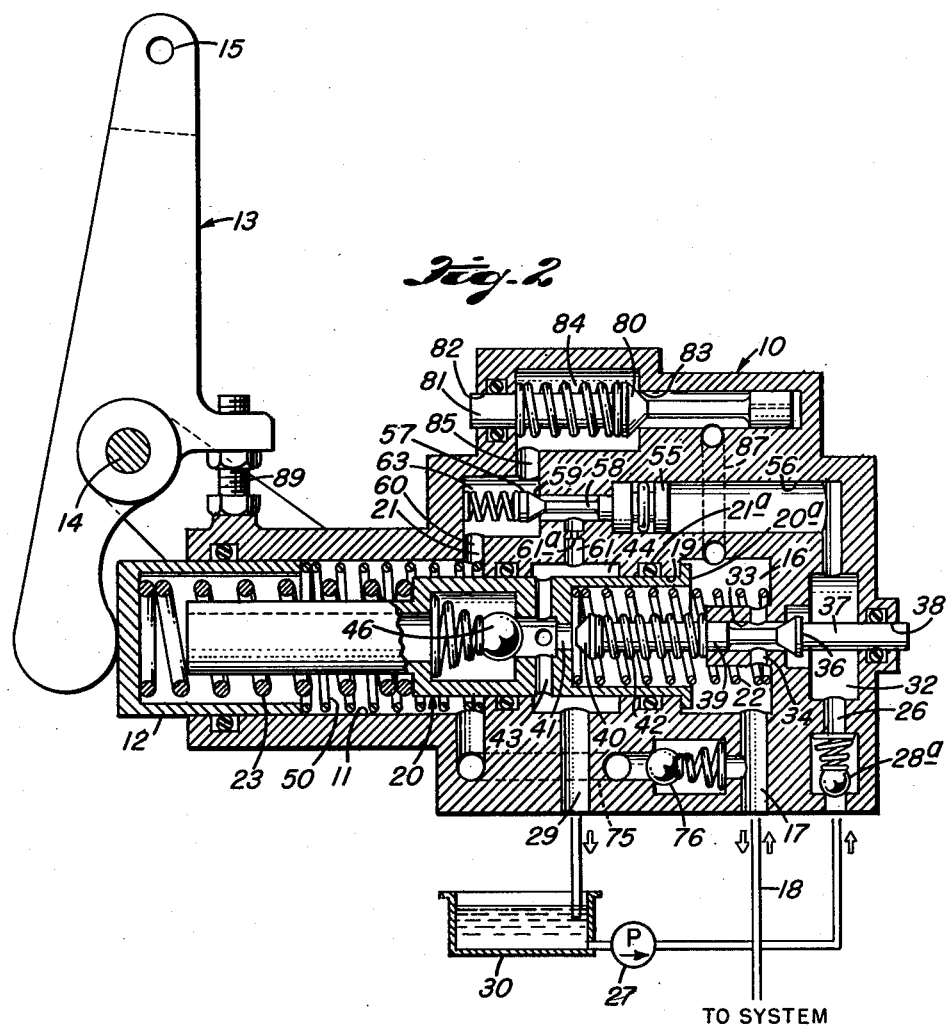

United States Patent Office 2,795,234
Patented June 11, 1957

2,795,234

COMBINATION MASTER CYLINDER AND POWER VALVE

Donald Z. Erle, Van Nuys, and Ralph L. Vick, Granada Hills, Calif., assignors to Bendix Aviation Corporation, North Hollywood, Calif., a corporation of Delaware Application August 15, 1955, Serial No. 528,148

6 Claims. (Cl. 137—87)

This invention relates to hydraulic brakes and like remote actuating systems, and particularly to the master or control unit for such a system.

Two general types of master control unit are in general use. In one, commonly known as the master cylinder type, manual or pedal force is applied to a piston to pump hydraulic fluid under pressure to the delivery or working line leading to the hydraulic motors (the wheel cylinders in a brake system) at the remote point. In the other type, commonly known as a power valve, the pedal force actuates a valve to admit fluid from a pressure source, such as a power pump or accumulator, to the working line at a pressure proportional to the pedal force applied. The second type of unit is dependent on a power source of fluid of pressure at least as high as the maximum pressure to be developed in the working line.

An object of the invention is to provide a practicable combination power valve and master cylinder that functions as a power valve as long as power fluid is available at a useful pressure, and automatically functions as a pump when the pressure of the power fluid is less than that it is desired to deliver.

Another object is to provide a combination power valve and master cylinder that offers substantially the same pedal resistance when operating as a pump as when operating as a power valve.

Another object is to provide a combination power valve and master cylinder in which the maximum pressure it can deliver when functioning as a power valve cannot exceed a predetermined value.

A feature of the invention is a combination power valve and master cylinder in which the pedal reaction rises at a greatly increased rate during power operation when the delivered pressure exceeds a predetermined value, to limit the maximum value of the delivered pressure.

Other more specific objects and features of the invention will appear from the description to follow with reference to the drawing, in which:

Fig. 1 is a schematic diagram of a combination power valve and master cylinder embodying the invention.

Fig. 2 is a schematic diagram showing a variation of the device shown in Fig. 1.

Referring to Fig. 1, there is shown a body 10 defining a master cylinder 11 containing a master piston 12 which is adapted to be moved into the cylinder 11 by an actuating lever 13 fulcrumed to the body 10 by a fulcrum pin 14. The lower, short end of lever 13 bears against the rear end of the master piston 12, and the upper, longer end of the lever is adapted to be connected by means of an eye 15 to a linkage leading to a pedal, or manual control handle.

Positioned in the body 10 forwardly from the master cylinder 11 is a reaction chamber 16 which is permanently connected by a working port 17 to a working line 18 leading to the remote motors to be actuated. The master cylinder 11 and the reaction chamber 16 are connected by a cylindrical passage 19 in which there is positioned a reaction piston 20. The reaction piston is sealed with respect to the passage 19 adjacent the ends of the latter, as by O-rings 21 and 21a, so that it constitutes a fluid barrier between the master cylinder and the reaction chamber and is subject to the pressures existing therein. In its normal position, the reaction piston is retracted, and a flange 20a on its forward end rests against a shoulder at the front end of the passage 19. This normal position of the reaction piston is maintained by a helical compression spring 22 compressed between the reaction piston and the front end wall of the reaction chamber 16. A spring 23, much stiffer than the spring 22, is provided between the master piston 12 and the rear end of the reaction piston 20, but this spring is only very slightly compressed in the normal position of the master piston, so that it exerts less force than the spring 22. A secondary, very stiff spring 24 is also provided on the rear end of the reaction piston 20, which is adapted to be engaged by the master piston 12 after the spring 23 has been compressed to a predetermined extent.

In addition to the working port 17, the body 10 defines a pressure port 26 which may be supplied with pressure fluid from a power pump 27 through a check valve 28. The body also defines a return port 29 which may be connected to a reservoir 30 from which the pump 27 draws fluid The pressure port 26 communicates with a pressure chamber 32, which in turn is communicated by a passage 33 and port 34 with the reaction chamber 16. The forward end of the passage 33 is normally closed by a poppet valve 36 having a stem 37 which extends through a sealed passage 38 in the body 10 to the exterior thereof. The stem 37 has nearly the same diameter as the passage 33, so that the valve is approximately balanced with respect to pressure in the chamber 32. The valve 36 also has a rearwardly extending stem 39 having a poppet 40 on its rear end normally slightly displaced from the end of a passage 41 which communicates the reaction chamber 16 with the master cylinder 11, and through laterally extending passages 43, with an annular return chamber 44 surrounding the intermediate portion of the reaction piston. This return chamber 44 is permanently communicated with the return port 29. Normally, the rear end of the passage 41 is closed by a ball check valve 46.

The rearward force exerted on the master piston 12 by the spring 23 is supplemented by that of the spring 50 which is compressed between the master piston and the forward end of the master cylinder 11. These two springs suffice to maintain the master piston 12 in the normal position shown, except when movement is imparted thereto by the actuating lever 13.

When the pressure port 26 contains pressure fluid exceeding a predetermined magnitude, the pressure acting on the forward end of a piston 55 in a cylinder 56 urges it to the end of the cylinder 56, in which position a poppet 57 on a stem 58 extending from the piston 55 is moved clear of a seat 59 to communicate the master cylinder 11 through a passage 60, the valve seat 59 and a passage 61 with the return chamber 44 which, as previously noted, is in constant communication with the return port 29. When the pressure in the pressure port 26 falls below a predetermined magnitude, the piston 55 is moved to the right by a compression spring 63 to seat the poppet 57 on the seat 59 and disconnect the master cylinder from the return port.

To limit movement of the master piston 12 by the actuating lever 13 when the pressure in the pressure port 26 is sufficient for full power operation, a retractable stop 65 may be provided in the path of an arm 13a on the actuating lever 13. The stop 65 constitutes an extension of a piston 66 in a cylinder 67 which is connected through the chamber 32 to the pressure port 26. The piston is sealed with an O-ring 66a to prevent leakage of fluid therepast. A helical spring 68 compressed between a flange 69 on the piston 66 and the rear end of the chamber provided for the flange 69 moves the piston 66 forwardly to retract the stop 65 when the pressure in the pressure port falls below the predetermined magnitude. The stop 65 is additionally restrained in retracted position by a detent means consisting of a garter spring 70 which engages an annular groove 71 in the stop. The detent spring 70 prevents movement of the stop 65 out of retracted position until the pressure acting on the front end of the piston 66 has risen to a value exceeding that necessary to start compression of the spring 68, so that the stop then snaps into extended position. The pressure required to extend the stop 65 is preferably much higher than that required to open the poppet 57.

The structure described functions as follows: When the pressure supplied by the pump 27 to the pressure port 26 exceeds the highest desired pressure in the working port 17, the stop 65 is extended, and the poppet valve 57 is open, as shown in Fig. 1. Since the open poppet 57 permits free circulation of fluid between the master cylinder 11 and the return port 29, actuation of the lever 13 in counterclockwise direction to advance the master piston 12 is unopposed by liquid pressure on the master piston, but is opposed only by the springs 23 and 50. A slight initial movement of the master piston compresses the stiff spring 23 to a point where its force exceeds that of the spring 22, whereupon the reaction piston 20 is advanced to first close the seat at the forward end of the passage 41 against the poppet 40 to disconnect the return port from the reaction chamber 16, and then move the valve 36 off its seat to admit pressure fluid from the chamber 32 into the reaction chamber and thence into the working port 17 and through the line 18 to the remote motors. Since forward movement of the reaction piston 20 is opposed by pressure in the reaction chamber 16, the increase in pressure in the reaction chamber as the pressure rises in the port 17 opposes the pedal force being applied to the lever 13, and the reaction force opposing pedal movement is largely proportioned to the pressure being delivered through the working port 17.

The pressure existent in the working port 17 and the reaction chamber 16 is a function of the position of the master piston 12, since this determines the extent of compression of the spring 23 required to close the poppet 36. Hence, the maximum pressure that can be obtained can be determined by so designing the arm 13a on the reaction lever that it contacts the stop 65 when movement of the master piston 12 sufficient to produce the desired pressure has occurred.

The output pressure rises relatively slowly during initial movement of the master piston while only the springs 23 and 50 are being compressed, and very rapidly (relative to pedal movement) after the master piston bottoms against the stiff spring 24. In a typical case, the output pressure may rise to 400 p. s. i. during movement of the master piston to engagement with the spring 24, and thereafter rise to 900 p. s. i. (maximum) with a very slight additional movement prior to engagement of the arm 13a with the stop 65.

When the pedal force is reduced, to permit the master piston 12 to retract, the pressure in the reaction chamber 16 forces the reaction piston to retract with it, opening the poppet 40 to release pressure fluid from the line 18 through the working port 17 and the reaction chamber to return port until the pressure drops to the value corresponding to the new position of the master piston 12.

Now let it be assumed that the pressure in the pressure port 26 is less than the maximum pressure that it is desired to develop in the working port 17, but is still sufficient to provide some assistance. In the typical case mentioned, the power pressure might be between 325 and 900 p. s. i. Under these conditions, the stop 65 is retracted, because the pressure on piston 66 is insufficient to overcome the spring 68, but the valve 57 is still open, because the spring 63 is not strong enough to overcome the power pressure. The device then functions as a power valve, exactly as described above, until the pressure in the working port 17 rises to the value of the pressure in the power port 26. Up to this point, the reaction piston 20 moves very slightly, since only a slight movement of the poppet 36 off its seat permits entry of power fluid. Thereafter, however, further movement of the master piston 12 in response to an increased pedal force advances the reaction piston 20 into the reaction chamber 16 to displace fluid therefrom through the working port 17 and further increase the pressure therein. In many brake systems and the like, there is very little additional fluid delivered to the working lines after the brakes (motors) have been initially charged, and the displacement of fluid resulting from the movement of the reaction piston into the reaction chamber 16 is sufficient to build the pressure up to the desired maximum value. It is to be noted that although the master piston has traveled farther than it would under full power operation, the pedal force (of which the extent of compression of the spring 23 is a measure) is only slight greater, the slight increase being due to the greater compression of springs 22 and 42. In each case, the major force opposing pedal movement is that of the working port pressure acting against the reaction piston 20.

When the power pressure is too low to be of any appreciable value, the transfer valve 57 is closed by the spring 63, so that escape of fluid from the master cylinder 11 to the return port is prevented. Therefore, advance of the master piston 12 into the master cylinder displaces fluid therefrom through a passage 75 and past a check valve 76 directly to the working port 17. The reaction piston 20 also moves with the master piston 12 to close the poppet 40 on its seat and prevent escape of fluid from the reaction chamber to the return port. The power poppet 36 is opened, as usual, but fluid cannot escape through the power port 26 because of the check valve 28 in the power supply line. During the advance of the master piston 12, the reaction piston 20 advances nearly as much, because the pressure against the front end of the piston is balanced by the same pressure in the master cylinder, and the spring 23 compresses very little. If one stroke of the master piston does not deliver enough fluid to raise the pressure to the desired value, the actuating lever 13 is partially released (not beyond the point where the return poppet 40 remains seated, else pressure will be released to return) and again advanced. The retraction of the master piston 12 by the springs 23, 24 and 50 draws new fluid into the master cylinder from the return port past the check valve 46. The subsequent advance of the piston 12 delivers this additional fluid through the passage 75 and past the check valve 76 to the working port 17. The operation of pumping the pedal to repeatedly reciprocate the master piston 12 can be repeated as necessary to build up the pressure in the working port 17. As previously described, during each advance of the master piston 12, the reaction piston advances with it because the check valve 76 is open, and the pressure in the master cylinder acting against the rear end of the reaction piston is substantially the same as the pressure in the reaction chamber acting against the front end of the reaction piston. During each retraction of the master piston 12, the check valve 76 closes, and the check valve 46 opens, so that the pressure in the master cylinder drops to the pressure of the return fluid. Since the high pressure in the reaction chamber 16 is still acting against the front end of the reaction piston, the latter retracts with the master piston 12. However, because of the greater displacement of the master piston 12 relative to that of the reaction piston 20, additional fluid is delivered to the working port on each reciprocation of the master piston 12.

The pressure that can be produced by pedal action depends upon the strength of the operator, and the area of the master piston 12. For a given maximum pedal force applied to the actuating lever 13, the area of the master piston 12 may be chosen so large that the maximum pressure producible is insufficient to open the poppet 57 and is less than the pressure obtainable with full power or partial power. However, it is sufficient for some purposes, such as actuating brakes of an airplane while it is being maneuvered on the ground with its power plant shut down.

An alternative mode of operation can be obtained by reducing the diameter of the master cylinder and piston and/or reducing the stiffness of the valve spring 63 to such an extent that the pressure producible in the master cylinder by pedal action is sufficient to open the valve 57. When the pressure in the master cylinder is relieved by opening of the valve 57, the full pedal force is available to advance the reaction piston, as in partial power operation. Since the reaction piston is always of smaller diameter than the master piston, it can produce a higher pressure in response to the same pedal force. It is to be noted that in practice the valve seat 59 can be made so small relative to the piston 55 that the opening and closing of the valve is substantially independent of the pressure in the master cylinder, and is determined almost entirely by the pressure in the reaction chamber. If, in the said alternative mode of operation, the valve 57 opens near the end of the forward stroke of the master piston and reaction piston, the operator again retracts and advances the pedal. The resultant retraction of the reaction piston drops the pressure enough to close the valve 59, so that during the subsequent advance additional fluid is delivered from the master cylinder to the working port, to raise the pressure therein and open the valve 59 and make the full pedal force available against the reaction piston before the end of the stroke.

The modification shown in Fig. 2 differs from that shown in Fig. 1 in that the check valve 28 in the power line in Fig. 1 has been replaced by a check valve 28a in the body 10 in Fig. 2; the spring 24 of Fig. 1 has been eliminated, and an extension provided on the reaction piston 20 in place thereof; and the stop 65 of Fig. 1 is replaced by a relief valve 80 in Fig. 2, which limits the pressure that can be delivered to the working port 17.

As to the location of the check valve 28 or 28a in the power line, it is merely a matter of convenience whether it is incorporated in the body 10 or in the external line, its function being the same in either case.

The important difference between the devices of Figs. 1 and 2, respectively, is the substitution of the relief valve 80 for the stop 65 to limit the pressure that can be produced in the delivery port. The valve 80 has a stem 81 projecting through a passage 82 in the body 10 so that it is exposed to atmospheric pressure. Furthermore, the stem 81 is made of substantially the same diameter as the seat 83 against which the relief poppet 80 seats, so that its action is unaffected by the pressure in the chamber 84 through which the stem 81 extends. The chamber 84 is communicated by a passage 85 with the chamber containing the transfer poppet 57 which is permanently communicated by the passage 60 with the master cylinder 11.

When the pressure in the reaction chamber 16 reaches the maximum desired value, the poppet 80 opens, and fluid is discharged from the reaction chamber 16 through a passage 87 past the relief valve 80 into the chamber 84, and thence through the passage 85 and past the poppet 57 and through the passage 61 to the return chamber 44. The passage 61 is restricted, as by an orifice 61a, so that there is a pressure drop produced between the master cylinder 11 and the return chamber 44 in response to fluid flow past the relief valve 80. The orifice 61a also produces a pressure drop between the master cylinder 11 and the return chamber 44 during normal operation of the master piston 12 for power valve operation. However, the volume of flow to and from the master cylinder under these conditions is too small to produce any appreciable pressure drop across the orifice 61a.

The operation of the device of Fig. 2 is identical in all respects with that of the device of Fig. 1 except when, during power valve operation, the actuating lever 13 is actuated into extreme position by a very high pedal force sufficient to raise the working port pressure to a value sufficient to open the relief valve 80, whereupon fluid flows from the reaction chamber 16 through the passage 87 past the valve 80 through the passage 85 and past the orifice 61a to return. The volume of flow under these circumstances is sufficient to produce a substantial pressure drop across the orifice 61a, raising the pressure in the master cylinder 11 above the return pressure. This increase in pressure directly urges the reaction piston to the right, tending to open the valve wider and increase the working pressure. However, the pressure in the master cylinder produces a much greater force on the master piston 12 because of the fact that it is of larger size than the reaction piston. The orifice 61a is so dimensioned that a pressure is developed in the master cylinder sufficient to overcome the pedal force applied to the actuating lever 13 and cause it to retract, thereby reducing the force applied from the master piston 12 through the springs 23 and 24 to the reaction piston, permitting the latter to partially close the power poppet 36 and reduce the working pressure.

It is to be particularly noted that in the first and second modes of operation of the devices of Figs. 1 and 2 for full power and partial power operation, respectively, the master cylinder 11 and master piston 12 do not function as such. Therefore, except in the third mode of operation (with no power fluid available), the only function of the master piston 12 is to advance the reaction piston 20 through the medium of the compression springs 23 and 24. Hence, if the third mode of operation is not desired, the passages 60 and 75 and the passage in the reaction piston closed by the check valve 46 can be eliminated, and the seal between the master piston 12 and the master cylinder 11 can be eliminated. The master piston 12 then becomes merely an actuating member, and the master cylinder 11 is simply a guide therefor. Of course, the transfer valve 58 could also be eliminated, as it functions only during the third mode of operation.

In both Fig. 1 and Fig. 2, an adjustable stop 89 is provided to limit the return movement of the actuating lever 13 and thereby limit return movement of the actuating member 12. This enables adjustment of the normal force exerted by the spring 23 on the reaction piston to a value such that a very slight initial movement of the actuating lever advances the reaction piston to close the return valve 40 and open the power valve 36. Thereafter, nearly the full range of movement of the actuating lever 13 is available to advance the reaction piston 20 into the reaction chamber 16 to build up the pressure in the working port under the second mode of operation.

Although for the purpose of explaining the invention a particular embodiment thereof has been shown and described, obvious modifications will occur to a person skilled in the art, and we do not desire to be limited to the exact details shown and described.

We claim:
1. A power valve comprising: a body defining a cylinder; a reaction piston reciprocable in said cylinder and defining with a front end thereof a reaction chamber; a working port connected to said reaction chamber; a pressure chamber, and means including a check valve for supplying power fluid thereto while preventing reverse flow therefrom; a return port; an actuating member reciprocable in said body toward and away from the rear end of said reaction piston; manually-operated means, and means for invariably coupling said actuating member in driven relation to said manually-operated means for movement of said actuating member in response to movement of said manually-operated means; and means mechanically coupling the actuating member to the reaction piston for advancing said reaction piston from a rear position of rest in response to advance of said actuating member; power valve means responsive to movement of said reaction piston for connecting said reaction chamber to said return port in said position of rest and disconnecting said reaction chamber from said return port and connecting said reaction chamber to said pressure chamber in response to initial movement of the reaction piston out of said position of rest, the said initial movement required to disconnect said reaction chamber from said return port and connect said reaction chamber to said pressure chamber being small relative to the maximum further movement of the reaction piston, so that advance of the latter beyond said initial movement displaces a substantial volume of fluid from said reaction chamber through said working port.

2. Apparatus according to claim 1 including: stop means movable between an inactive position and an active position, and pressure-responsive means connected to said pressure chamber for moving said stop means into active position in response to pressure exceeding a predetermined value and into inactive position in response to pressures below said value, said stop means when in active position cooperating with said actuating means to limit the advance of said actuating member to a predetermined value.

3. Apparatus according to claim 1 in which said means mechanically coupling said actuating member to said reaction piston comprises a first resilient member yieldably coupling them in all positions thereof and a second substantially rigid member engageable between said actuating member and said piston after predetermined yielding of said first member for thereafter moving said reaction piston substantially in unison with said actuating member.

4. Apparatus according to claim 1 in which said body defines a master cylinder rearwardly of said cylinder containing said reaction piston, and said actuating member comprises a master piston in said master cylinder for displacing fluid from said master cylinder in response to advance of the piston; means including a check valve defining a one-way flow passage from said return port to said master cylinder; means including a check valve defining a one-way flow passage from said master cylinder to said working port; and master cylinder venting means including a pressure-actuated valve responsive to a predetermined pressure in said pressure chamber for providing a two-way passage between said master cylinder and said return port to prevent pressure buildup in said master cylinder in response to movement of said master piston.

5. Apparatus according to claim 4 including relief valve means for venting fluid from said reaction chamber in response to a predetermined excessive pressure therein.

6. Apparatus according to claim 5 in which said relief valve means connects said reaction chamber to said master cylinder, and said master cylinder venting means includes a restricted passage for producing a pressure drop between said master cylinder and said return port in response to fluid flow through said relief valve means and master cylinder venting means.

References Cited in the file of this patent

UNITED STATES PATENTS

| 2,478,002 | Mott | Aug. 2, 1949 |
| 2,478,475 | Gardiner | Aug. 9, 1949 |
| 2,661,597 | Edge | Dec. 8, 1953 |
| 2,670,004 | Deardorff et al. | Feb. 23, 1954 |
| 2,676,465 | Gladden | Apr. 27, 1954 |
| 2,688,335 | Gunderson | Sept. 7, 1954 |
| 2,696,827 | Deardorff et al. | Dec. 14, 1954 |